E. S. BENNETT.
Apparatus for Separating Sand from Water.

No. 203,104. Patented April 30, 1878.

UNITED STATES PATENT OFFICE.

ERASTUS S. BENNETT, OF DENVER, COLORADO.

IMPROVEMENT IN APPARATUS FOR SEPARATING SAND FROM WATER.

Specification forming part of Letters Patent No. 203,104, dated April 30, 1878; application filed December 29, 1877.

*To all whom it may concern:*

Be it known that I, ERASTUS S. BENNETT, of the city of Denver, county of Arapahoe, and State of Colorado, have invented a new and useful Device for Taking Tailings out of Tanks used for Separating Gold, which device is fully set forth in the following specification and accompanying drawings, in which—

Figure 1:
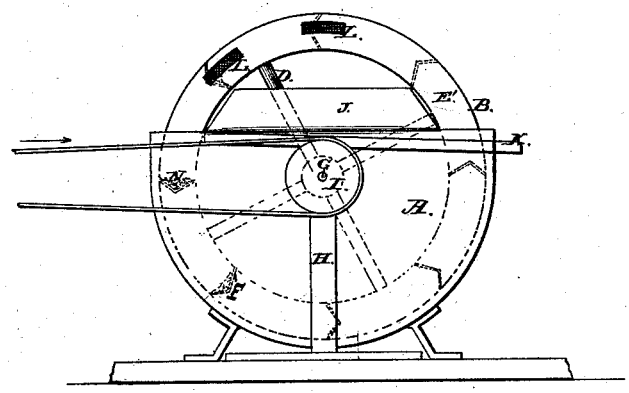
Figure 2:
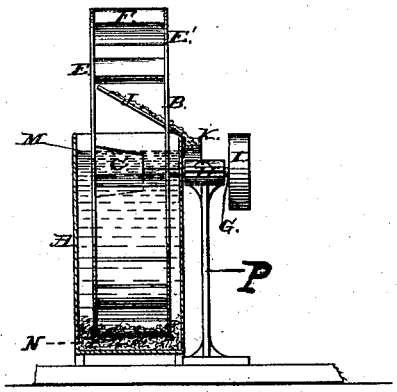

Figure 1 is a side elevation, and Fig. 2 a transverse elevation, partly in section.

The object of the invention is to provide a simple and durable means for taking sand, crushed rock, or other material out of tanks or other vessels partially filled with water without removing therewith any considerable portion of the water, and to be used in connection with an ore-washer to separate the sand or tailings from the water, so that it can be used over and over again for washing.

In the drawings, A represents such a tank; B, a wheel, consisting of the hub C, spokes D, rims E E', and buckets F F. The shaft G is supported by a long bearing in pillow-block H, supported outside the tank by the standard P. The wheel is turned by the pulley I, or by any suitable means.

The inclined plate J passes into the wheel, the spokes D being set at the inner end of the hub to permit of said plate occupying said position. On the outside of the tank or vessel a suitable sluice is placed, as at K.

L L represent pieces of wire-cloth or other fine screen, which may be placed either over openings made in the rims E E', or in the buckets themselves, (the object being to more thoroughly drain the water off,) or they may be dispensed with altogether.

In operation, the wheel should be placed in the lowest part of the tank or vessel, or a separate vessel connected by suitable openings with the main vessel, but set a little lower than the latter, or so that the material will settle in the one containing the wheel. As the wheel slowly revolves, the buckets F scoop up whatever has settled at the bottom, and carry it up out of the water, (shown by dotted line M,) and the water on top runs back into the tank, while the sand or other heavy material remains in the buckets until the buckets have passed above the surface of the plate J, upon which it now falls, sliding down its incline over the edge of the tank into the sluice K or other receptacle. The bearing being outside of the tank prevents wear, which would be rapid if it, or any part of it, were inside, and subject to the action of the water and sand. Any suitable packing is placed around the shaft where it passes into the tank A to prevent leakage.

One rim, E', may be dispensed with, and the buckets may be made in any other shape, so long as they dump their contents toward the center or on the plate J, or its equivalent, for the purpose of passing it over the edge of the tank into the sluice or conveyer K.

What I claim as my invention, and desire to secure by Letters Patent, is—

1. The elevating-wheel B, provided with the buckets F and the perforations L, in combination with the inclined plate J, extending partly within said wheel, substantially as and for the purpose set forth.

2. The elevating-wheel B, having perforations L and buckets F situated at or about its periphery, in combination with the tank A, substantially as and for the purpose set forth.

3. The elevating-wheel B, having the perforations L and buckets F, in combination with a support or supports placed outside of and independent of the tank A, substantially as and for the purpose set forth.

ERASTUS S. BENNETT.

Witnesses:
LORIN A. STALEY,
F. B. POTTER.